United States Patent [19]

Clarke

[11] 4,312,605
[45] Jan. 26, 1982

[54] METHOD FOR GROUTING JOINTS AND/OR CRACKS IN SEWER CONDUITS

[75] Inventor: William J. Clarke, Ridgewood, N.J.

[73] Assignee: Hayward Baker Company, O'Denton, Md.

[21] Appl. No.: 133,361

[22] Filed: Mar. 24, 1980

[51] Int. Cl.$^3$ .................. E02D 3/12; E02D 29/10; E21B 33/138
[52] U.S. Cl. .................. 405/264; 138/97; 166/295; 405/155
[58] Field of Search ............ 405/146, 154, 155, 264; 138/89, 97, 98; 264/36; 137/15; 166/277, 295, 300

[56] References Cited

U.S. PATENT DOCUMENTS

| | | |
|---|---|---|
| 2,651,619 | 9/1953 | De Mello et al. |
| 2,801,984 | 8/1957 | Morgan et al. |
| 2,801,985 | 8/1957 | Roth. |
| 2,842,338 | 7/1958 | Davis et al. ............... 166/295 |
| 3,136,360 | 6/1964 | Ramos ...................... 166/295 |
| 3,210,310 | 10/1965 | Holbert et al. ............ 166/295 X |
| 3,580,879 | 5/1971 | Higashimura et al. ..... 260/29.7 H |
| 3,872,923 | 3/1975 | Knight et al. ............. 166/295 X |
| 4,094,150 | 6/1978 | Clarke ...................... 166/295 X |
| 4,193,453 | 3/1980 | Golinkin .................. 166/295 |

OTHER PUBLICATIONS

AM-9 Chemical Grout, American Cyanamid Co. Publication No. EN 111A, 5/75.
AM-9 Plus, American Cyanamid Co. Publication No. EN-115, 5/75.
Infiltration Control with AM-9 Chemical Grout, American Cyanamid Publication No. ENT-15, 6/77.
All about Cyanamid AM-9 Chemical Grout, American Cyanamid Publication No. EN-4, 10/75.

*Primary Examiner*—James A. Leppink
*Assistant Examiner*—George A. Suchfield

[57] ABSTRACT

This invention is concerned with a method of grouting sewer conduits by using an aqueous liquid composition comprising unsaturated monomers including (1) magnesium diacrylate, (2) an alkali metal (sodium or potassium) monoacrylate in a weight ratio of (1):(2) from about 90:10 to about 70:30, and (3) a polyethylenically unsaturated monomer copolymerizable with (1) and (2) to produce covalent cross-linking bonds in the copolymer besides the ionizable magnesium bonds. The weight ratio of (3) to the sum of (1) and (2) is in the range of about 3:97 to about 5:95. Examples of monomers that can be used as part or all of component (3) include N,N'-methylene-bis-acrylamide and ethylene glycol diacrylate. The relative proportions between the several monomers are selected to provide on polymerization a cross-linked vinyl addition polymer gel containing both covalent (non-ionic) cross-linking bonds and ionic cross-linking bonds and the relative proportions between the several components are predetermined to render the composition suitable for application by conventional mixing packer equipment hereinafter described. In such equipment, means is provided to direct a second aqueous solution or suspension containing a water-soluble free radical initiator, such as a persulfate or peroxide, separately but concurrently with the first monomer-containing solution to a common distributor head of the movable packer positioned in the sewer conduit adjacent the joint or crack to be repaired. The monomer solution is provided with a polymerization catalyst, so that when the two liquids mix, upon discharge from the head, a rapid polymerization to a polymer gel occurs at the ambient temperature.

4 Claims, No Drawings

METHOD FOR GROUTING JOINTS AND/OR CRACKS IN SEWER CONDUITS

BACKGROUND OF THE INVENTION

U.S. Pat. No. 2,651,619, Sept. 8, 1953 (de Mello et al) discloses the stabilization of soils, such as the top layer of a roadway, by mixing therewith a water-soluble polyvalent metal acrylate, such as calcium acrylate, and polymerizing the acrylate with a redox catalyst system. Using 4 to 25%, based on dry soil weight of calcium acrylate, compressive strengths of the stabilized soil up to 600 psi are obtainable.

Morgan et al U.S. Pat. No. 2,801,984, Aug. 6, 1957 discloses compositions for stabilization and impermeabilization of soils with a water-soluble copolymerizable mixture of an alkylidene bisacrylamide, particularly N,N'-methylene bisacrylamide, with a relatively large proportion of one or more water-soluble ethylenic monomers. The latter monomer is broadly defined in the passages of column 2, lines 59-71, and from column 8, line 50, to column 9, line 13. The extensive list of specific monomers presented in column 9, lines 14 to 71 includes alkaline earth metal as well as alkali metal acrylates and methacrylates. However, in lines 16-18 of this passage, N-methylol-acrylamide, calcium acrylate, and methacrylamide are especially mentioned as examples and it is asserted that optimum results are obtained with acrylamide. In the actual working examples, acrylamide, N-methylol acrylamide, and calcium acrylate, or mixtures of two or more of them are used.

Roth U.S. Pat. No. 2,801,985 Aug. 6, 1957 is similar to Morgan et al in respect to the definition of the covalent crosslinker and that of the water-soluble ethylenic comonomer but is based on the use of nitrilotrispropionamide (NTP) as the activator (or accelerator) of a redox system. All working examples use a mixture of acrylamide and N,N'-methylene bisacrylamide, in most of which the polymerizable mixture comprises 95% of acrylamide and 5% of the bisacrylamide which is designated in the patent as "Stabilizer AM-955" and like AM-9 and "AM-9 PLUS", is a registered trademark of American Cyanamid Co. for mixtures of acrylamide and N,N'-methylene bisacrylamide.

Davis et al, U.S. Pat. No. 2,842,338, July 8, 1958 points out that many factors are involved when calcium acrylate is used in attempts to impermeabilize soils and permeable formations penetrated by wells making it difficult to control. Davis et al provides systems for plugging such permeable formations wherein polyacrylic acid is first introduced into the formation through the drilling fluid, and then a water-soluble salt of a polyvalent cation, such as calcium or magnesium chloride, is introduced to react with the acrylic acid polymer and cross-link it.

Ramos et al U.S. Pat. No. 3,136,360, June 9, 1964 discloses the addition of a "filter aid material", such as diatomaceous earth, to gel-forming sealing compositions such as the AM-9 compositions of Roth supra for use for sealing-off an underground water-bearing formation penetrated by the bore of a well in which air or gas drilling operations are being performed. Clarke, U.S. Pat. No. 4,094,150, June 13, 1978, incorporates an unfired natural diatomaceous earth, 80% having a particle size between about 2 and 10 microns, in an acrylamide/N,N'-methylene bisacrylamide grout of the AM-9 category.

Higashimura et al, U.S. Pat. No. 3,580,879 May 25, 1971 discloses grouting with gelable compositions which may comprise (1) 1 to 90 weight % of a metal (meth)acrylate (2) 3 to 90 weight % of a water-soluble ethenoid monomer, such as acrylamide or a hydroxyalkyl or an aminoalkyl (meth)acrylate, and (3) 1 to 30 weight % of a water soluble divinyl monomer. The metal of (1) may be monovalent to polyvalent (column 3, line 72 to column 4, line 7); the monomer of (2) may be acrylamide or any of those mentioned in column 3, lines 40-53; and the divinyl monomers may be any of those listed in the passage of column 3, lines 61-8. However, the gist of the patent is the use of certain redox catalyst systems for accelerating the polymerization.

American Cyanamid Company bulletin ENT-15 having 8 pages and published in 1977 illustrates on page 5 thereof typical "mixing packer" grouting equipment of conventional construction for grouting leaky joints or cracks in a sewer line or conduit. The AM-9, AM-955, and AM-9 PLUS grouts have had extensive commercial application for the grouting of sewer lines or other conduits using this type of equipment. This grout which contains a large proportion of acrylamide (a neurotoxic chemical) is a serious health hazard and, as stated on pages 6, 7, and 8 of this bulletin (ENT-15), requires special core, clothing, and so on. Other American Cyanamid Company bulletins on grouting sewer lines with AM-9 or AM-9 PLUS that show this type of equipment include EN-115 (1975), especially pages 1-5 thereof; EN-111A (1975), page 2; and the 95 page booklet EN-4 (1975) page 26 especially. Attempts heretofore to provide effective chemical grouts adapted to be applied in sewer lines by conventional equipment without acrylamide content by using calcium or magnesium acrylate or methacrylate have previously been unsuccessful for one or more of various reasons: too much shrinkage by loss of water on setting of the polymer gel; too strong a polymer gel making it difficult or impractical to move the "packer unit" to the next grouting position within the line; too long a gel time—about 10 to 30 seconds gel time is required for efficient sealing of sewer joints; too high viscosity—in practice, a low viscosity (about 5 to 10 cps) grout is required to seal the joint and to penetrate the soil around the joint.

DESCRIPTION OF THE INVENTION

In accordance with the present invention there has been discovered an efficient chemical grout which contains no acrylamide and is adapted to be applied by conventional grouting equipment having a mixing-packer unit that can be pulled or moved through the sewer line or other waste conduit from one manhole to the next, with interruption of the movement at longitudinally spaced positions within the conduit wherever a joint or fissure which needs sealing to stop seepage or leakage is located.

The present invention is concerned with a method of grouting sewer conduits by using an improved chemical grouting composition having two fluid (liquid or dispersion) systems containing no acrylamide, which are fed in separate flexible hoses to the site of application, e.g. within a sewer conduit where they are mixed and react very rapidly to form a polymer gel which serves to seal or grout a leaky joint or crack in a sewer or other waste overflow or drain lines or conduits which may extend through the soil or subsoil above or below the water table. Such sewer lines or conduits may be formed of a series of tubular pipe sections formed of cast iron, polypropylene and more commonly of ceramic or clay tile. The sections may have an internal diameter of about eight inches to twenty-four inches and lengths of 2 to 10 feet or more between joints. At spaced intervals along the sewer line network, manholes are provided for access by a person to inspect or service the conduit or conduits extending between the manholes.

One example of the type of conventional equipment available for grouting of leaky joints is schematically shown in the American Cyanamid Company bulletin ENT-15 mentioned hereinabove under the heading, "Background of the Invention", see FIG. 6 on page 5 of the bulletin and the description thereof. The mixing tanks, pumps, flexible lines or hoses (suitable reeling equipment for latter), compressed air supplies and associated fittings (valves, rotary connectors, etc.) may be mounted on a truck to bring the equipment near one manhole providing access to the sewer line or conduit. The hoses are connected to an assembly called a mixing packer which can be drawn into the sewer conduit to be grouted at leaky joints or cracks. This packer may have various structural details. However, as shown in FIG. 6 of ENT-15, it may simply be a hollow tube having a cylindrical periphery of lesser diameter than the inside diameter of the sewer conduit (diagrammatically shown in phantom outline). An annular hollow inflatable bladder or "donut" is provided on the outside of the hollow tube adjacent each end thereof.

In FIG. 6, the bladders are shown inflated to form a tight seal against the inside walls of the sewer conduit, thereby providing a confined annular space adjacent the joint or crack to be grouted. The two flexible grout hoses from the respective grout and initiator tanks are connected to suitable pipes which extend to the periphery of the hollow tube between the packer bladders. Each of the pipes may terminate in one or more openings in the tube periphery so that this intermediate portion of the tube may be referred to as a distributor head, each grout solution being isolated from the outer until they flow out of the openings and mix in the annular space between the two bladders. A compressed air hose is connected to the bladders to inflate them and another compressed air hose is provided with one or more discharge openings in the intermediate section of the tube so that sealing by the gel can be tested before deflating the bladders and shifting the packer assembly to the next joint or leaky crack in the sewer conduit. To aid the shifting of the packer assembly to the next joint or crack to be grouted, the hollow tube may be closed at its ends and a rope, chain or cable may be attached to a suitable hook or eye-bolt secured to the leading end of the packer assembly (the right end as viewed in FIG. 6 of ENT-15). This cable may extend through the sewer line to the next manhole where it can be used to pull the packer to the next point in the line needing grouting. Closed circuit television may be employed to assist in the locating of the packer with its mixing header intermediate portion in alignment with a joint or crack to be grouted. This may be done by tying a TV camera in the cable line a short distance from the leading end of the packer and illuminating that end of the packer by means of a light source which like the camera is directed toward that end of the packer. Because the bladder is in collapsed (deflated) condition during the pulling of the packer within the sewer conduit, the operator monitoring the TV receiver which may be located in the truck can see when the packer header is positioned properly for grouting this site (crack or joint). At that point, he stops the pulling of the cable, inflates the bladders, actuates the grout pumps, tests the seal at an appropriate time interval after grouting, deflates the packer bladders, and repeats the cycle until all leaky joints or cracks in the conduit have been grouted. The operation of this system, closed TV, packer and all with AM-9 and AM-9 PLUS chemical grouts is illustrated on page 26 of a booklet EN-4 supra entitled "All about Cyanamid AM-9 chemical grout" published in 1975 by the American Cyanamid Company.

As illustrated in the aforementioned American Cyanamid Company publications, EN-4 and ENT-15, conventional equipment for grouting of joints or cracks in a sewer conduit by applying the grout inside the conduit comprises an assembly of a liquid-distributing header which may take the form of a disc or hollow tube having a cylindrical periphery of a diameter smaller than the inside diameter of the conduit. At each side of the header disc or mounted on axially spaced portions of the tube periphery there is an inflatable annular "donut", bladder or ring of rubber or synthetic rubber. These rings are normally smaller in outer diameter than the inside diameter of the conduit, but are connected by a flexible hose to a compressed-air line to expand their outer diameters to form a tight seal or barrier in the conduit and thereby confine the grouting material to the annular zone between the header periphery and the adjacent wall of the conduit when the assembly is in position for grouting a joint or a crack in the conduit. The assembly of the distributer and the expansible rubber rings is called a "mixing packer" by the operators. Flexible hoses, each connected to a supply tank for a respective one of the liquid systems or components of the grout, terminate in separate radially-extending pipe systems which have one or more dischare openings in the header periphery between the bladders.

A suitable detector system may be used to determine when the disc of the packer is aligned with a joint or crack in the wall of the conduit. This may comprise a light source and closed-circuit television camera in the conduit connected to a TV receiver which may be mounted where an operator controlling the grouting procedure can monitor it. Thus, the receiver may be provided in a truck carrying two stainless steel tanks for supplying the separate grout liquid systems components, a reel for paying out or reeling in the flexible hoses which may be a four-component hose, two for the grout systems, and two for compressed air, one of which is used to inflate the rubber rings of the packer and the other is connected to the header to air-test the seal. The contents of the two tanks may be under pressure or a positive displacement pump may be provided with each tank to discharge the contents of the respective tanks at the proper rate to mix the separate streams in the proper predetermined proportion when they are discharged from their respective openings in the disc during grouting.

This equipment has been used for grouting leaky joints or cracks in sewer conduits with a two-liquid component chemical grouting system in which one liquid was an aqueous solution of acrylamide and N,N'-methylenebisacrylamide containing dimethylaminopropionitrile, and the other liquid was an aqueous ammonium persulfate solution. The overall composition of the mixture obtained in the annular zone between the disc periphery and the conduit wall may be an aqueous solution of about 9.5 weight % of acrylamide, about 0.5 weight % of N,N'-methylenebisacrylamide, 0.8 weight % of dimethylaminopropionitrile and 2 weight % of ammonium persulfate. The resulting mixture forms a gel in 30 seconds at 60° F.

Briefly, the sequence of operation of the equipment is as follows: The packer and TV camera are placed in the sewer line and they are moved into the line until the distributor of the packer reaches a leaking joint or crack as determined by monitoring with the closed-circuit TV. The packer assembly is stopped, the rubber rings are inflated to expand them tightly against the conduit wall, and the two liquid components of the chemical grout are forced to the distributor of the packer where they issue and mix, penetrate the fissures of the joint or crack and then the soil or earth adjacent to or surrounding the conduit joint or crack. The grout polymerizes to form a gel which fills the confined annular zone inside the conduit, extends through the leaky passages or fissures in the joint or the wall of the conduit, and also penetrates into the soil or earth adjacent or surrounding the outside surface of the conduit where it serves to stabilize the soil or earth. The grouted joint or crack is tested with compressed air before deflating the packer rings. Then, the packer rings are deflated and the packer assembly is moved to the next leaky joint. The movement of the packer may be impeded or even prevented by the gel ring formed inside the conduit if the polymer gel has a high gel strength and/or a high shear (or tear) strength. Also, the gel formed must have a moderate adhesion to the conduit wall but not such a strong adhesion thereto that movement of the packer assembly cannot break the inside gel ring away from the conduit with a low to moderate force. Another quality required is that of frangibility (which also involves tear strength). The movement of the packer assembly relative to the inside gel ring should not only release it from adherence to the conduit wall, but should effect a crumbling of the gel ring without disintegration of its outer portion which seals the joint, crack or fissure in the conduit, so that the flow of sewage or waste will wash the crumbs or particles along the inside of the sewer line without impeding the desired waste flow. The packer movement and grouting sequence is repeated until all leaks in the sewer lines and the network thereof are sealed.

The chemical grout containing a large proportion of acrylamide, in spite of its neurotoxicity, has been used for sealing leaky joints in sewer lines by means of the equipment described above for many years because it produces a gel that has the special properties required to work satisfactorily in such equipment. Because of its toxicity, acrylamide grout use is a hazard for the workers handling it.

In accordance with the present invention, a chemical grout that is characterized by relatively low toxicity, and especially in respect to little or no neurotoxicity, of the monomeric components while having the low viscosity, rapid gelling, and other characteristics required for practical application by conventional equipment of the general type described hereinabove, which for convenience hereinafter is simply referred to as sewer line packer equipment, by the general procedure wherein the mixing packer is passed within the line with brief interruptions of such passage at the points in the line needing grouting.

The grouting composition that has been discovered to provide the necessary properties comprises an aqueous solution containing, as its main monomeric component, a mixture of 60 to 90 weight % of magnesium diacrylate, which for simplicity may be referred to as magnesium acrylate or MgA, and 40 to 10 weight % respectively of an alkali metal acrylate, such as that of sodium or potassium. In addition, this solution must contain a relatively small amount of about 2 to 5% by weight based on the total weight of metal acrylate salts, of at least one copolymerizable polyethylenically unsaturated monomer in which at least two unsaturated radicals are joined exclusively by covalent bonds, in contrast with MgA wherein the two unsaturated acrylate radicals are joined by the ionizable Mg bonds. The proportion of the covalent crosslinker that is actually used may be limited by the water-solubility of the particular compound or mixture thereof that is selected and the particular metal acrylate salt mixture in this aqueous solution. This, when N,N'-methylenebisacrylamide (MBA), a preferred crosslinker, is used as the entire covalent crosslinker, the preferred range of proportion is from about 3% to 4% by weight, based on the total weight of the metal acrylate salt component, since an amount of this cross-linker in excess of about 4% by weight tends to precipitate, especially if shaken during shipment, from the aqueous monomer solution having a concentration in the range of 20-40% solids. While MBA is mentioned as the preferred covalent crosslinker, other alkylidene bis-acrylamides may be used, such as those of Lundberg, U.S. Pat. No. 2,474,846, the disclosure of which is incorporated herein by reference. Other covalent crosslinkers may also be used such as glycol diacrylate, hexyl acrylamidopropyl dimethylammonium chloride, glycerol diacrylate, 1,3-di(acrylamidomethyl)-2-imidazolidone, allyl acrylate, allyl methacrylate, and 1,3,5-triacrylylperhydro-1,3,5-triazine.

The aqueous grout solution of monomers just described is fed by one of the grout hoses to the distributor header of the packer unit and the other aqueous solution or dispersion of free radical initiator is fed to the header by another of the flexible hoses so that upon discharge of the two solutions from the header, they mix with resultant rapid polymerization to form the grouting gel polymer. In its simplest version, the initiator dispersion is an aqueous solution of a water-soluble free radical initiator, such as ammonium persulfate (AP), potassium persulfate (KP) or t-butyl peroxide, the concentration of the initiator being from about 0.5 to 12 weight % in its solution and the proportion being selected to provide the desired proportion thereof relative to the amount of monomers in the monomer solution mixed therewith upon discharge from the header of the two solutions. As stated above, the packer equipment may have a feed system in which the relative proportions of the two aqueous solutions, the monomer solution which may be referred to as component A and the initiator solution which may hereinafter simply referred to as B, may be predetermined to provide the mixing of the desired amounts thereof on discharge from the distributor header of the packer. In practically all cases, the amounts of the two components A and B which are simultaneously discharged from the header for mixing together at the leaky joint or crack can be of equal volumes and the components A and B are made up in the examples set forth hereinafter on the basis that (unless otherwise specifically stated) the grouting will be effected by mixing A and B in approximately equal volume proportions. It is to be understood, however, that the proportion of monomer in component A may be changed relative to the free radical iniatiator content of B to adapt the system to operate satisfactorily with equipment which feeds the two components A and B in a volume ratio other than 1:1 as stated.

In the grouting system of the present invention, component A which contains all of the monomer, MgA, alkali metal acrylate, e.g. NaA, and covalent cross-linker, also contains about 0.01 to about 6% by weight based on total monomer of a water-soluble amine, such as triethanolamine (TEA) which upon mixing with the component B containing a peroxy initiator, forms a redox system. The reducing agent, e.g. TEA, speeds up the polymerization, and hence is frequently referred to as an activator, an accelerator, or even more commonly as a catalyst. The action of the amine may be accentuated by the presence of traces of reducing metal ions which are generally referred to as promoters. However, it is ordinarily unnecessary to deliberately add such metal ions to a sewer grout because of the adventitious presence of traces of such metal ions in the sewer conduit or line.

Component A, and optionally B as well, contains a small but effective amount on the order of 50 to 500 parts per million (ppm) of a biocide, of slight but limited solubility in water, having fungicidal and bactericidal action to inhibit deterioration of the components and the polymer gels formed therefrom by fungal and bacterial attack, especially by such micoorganisms that domestic and industrial wastes abundantly contain.

Various biocidal compositions may be used such as various dithiocarbamate salts or mixtures thereof, e.g. the sodium, potassium, zinc, copper, or manganese salts, one commercially available product containing a mixture of equal parts by weight of sodium dimethyl dithiocarbamate and disodium ethyl-bis-dithiocarbamate, others providing the zinc, copper and manganese salts, or mixtures of such salts including a mixed zinc and manganese salt. Various quaternary ammonium compounds, such as tetraalkylammonium chloride, sulfate, or hydroxide in which one or two of the alkyl groups have from 6 to 18 or more carbon atoms may be suitable. Examples thereof include: cetyldimethylbenzylammonium chloride monohydrate, myristyldimethylbenzylammonium chloride dihydrate, myristyltrimethylammonium bromide, stearyldimethylbenzlammonium chloride, cetyldimethylethylammonium bromide, and cetyltrimethylammonium p-toluenesulfonate. Various organometal salts or oxides, such as bis (trialkyltin) oxide may also be used. Generally, these compounds in which the alkyl group has 4 to 8 carbon atoms, such as n-butyl, are commercially available. An example thereof is bis (tributyltin) oxide, which may be dispersed with a suitable emulsifying or dispersing agent. The quaternary ammonium biocides just mentioned also serve as dispersing agents. The bis (tributyltin) oxide may be mixed with one of these quaternary ammonium biocides to aid in dispersing the insoluble oxide so that there is a dual biocidal action obtained. Other biocides include chlorinated phenols, organic sulfur compounds, and mercury salts and organic mercury compounds.

Because of the practically water-insoluble nature of the most effective of these biocides, they may require anionic, cationic, or nonionic surfactant dispersing agents to disperse them in the aqueous components A and/or B. Such dispersion or suspension serves to distribute the biocide with the associated surfactant throughout the polymer gel formed and assures that release from the gel grout is at best extremely slow, thereby maintaining biocidal protection of the grout over an extended period of time. The surfactant itself may have biocidal activity so that both the dispersed biocide and the dispersing surfactant function to exert supplemental and/or complemental protective action, as is exemplified by the use of one of the long chain alkyl dimethyl benzyl ammonium chlorides with the bis (tributyltin) oxide above. The amount of the quaternary biocidal dispersant may be greatly in excess of the amount needed merely to disperse the organotin oxide. When a quaternary biocide is used it may be combined with the polymer gel formed by replacing part of the magnesium or alkali metal ions with the cationic radical of the quaternary ammonium compounds. This salt formation may also contribute to the slow release of the biocide from the gel.

In addition the aqueous solution A may contain an agent to inhibit the entry and growth of roots in the grouted joints and cracks of a sewer line. The commonly used compound for this purpose is 2,6-dichlorobenzonitril (DCBN) which is commercially available as a product in which it is mixed with or absorbed on, finely divided clay particles as a carrier in a weight ratio of about 1:1. In this form, the clay aids in dispersing it and it is quite compatible with the other ingredients of the grouting component A as made up in accordance with the present invention. The amount of DCBN may be such as to provide a concentration thereof of about 200 ppm in the mixture of components A and B. A small amount of a surfactant may be used to emulsify or disperse the DCBN in an aqueous component, such as component A; a nonionic surfactant such as p-t-octylphenoxypoly (10 to 50)ethoxyethanol, may be used for this purpose.

Optionally, there may be included in one component, but preferably in both components A and B (in about equal proportions to keep the viscosities in both about the same) of the two-part composition of the present invention up to about 6% by weight, based on the total weight of A and B when they are supplied to the packer in approximately equal volumes, of finely-divided water-inert solid particles having surfaces, irregular and/or porous, which may be simply referred to as "filter aid material" and are useful when the sewer conduit to be grouted happens to be located in coarse earth or crushed stone or rock. The rate of flow of such a grout through the numerous channels in the surrounding earth is slowed down by the particle-loaded grout so that the channels are blocked or "blinded" with the particulate materials, thereby preventing rapid escape of the grout away from the zone immediately surrounding the zone of the sewer conduit being grouted. Examples of such materials include diatomaceous earth and various synthetic calcium silicate compounds as described in Ramos et al, U.S. Pat. No. 3,136,360 and Clarke U.S. Pat. No. 4,094,150, and the disclosures of those patents in reference to the "filter aid material" are incorporated herein by reference.

The amounts of filter aid material, such as diatomaceous earth, should not be so high as to raise the viscosity of the two component dispersions sufficiently to interfere with the ease of forcing or pumping them to the distributor head of the packer. Suitable surfactant dispersing agents may be used to disperse the filter aid material when it is included. As stated above, the use of filter aid material is optional but in some instances depending on the nature of the fissures in the line and the soil or earth in or about the line, the use of the filter aid material may be quite desirable. Whereas particulate matter, such as sand, lime, clay, and cement tends to increase the strength of the grout formed from the aqueous dispersions A and B, the amount of such matter, even when added in the form of filter aid material, such as diatomaceous earth, should not be so high as to provide a polymer gel within the sewer line surrounding the packer having such strength (adhesive, cohesive and shear) as to interfere with the shifting of the packer with its collapsed bladders to the next stage of grouting.

In the preferred grout of the present invention, the monomer composition (component A) is an aqueous solution containing dissolved therein from 20 to 40% preferably 24 to 30%, by weight of a mixture of magnesium diacrylate, sodium acrylate and N,N'-methylene-bis-acrylamide in which the relative weight proportions of the monomers are about 23.18 MgA, about 5.7 NaA, and about 1.12 MBA, the remainder of component A, to make 100 total weight % being primarily water except for a small content (1 to 8 weight %) of a catalyst, such as TEA, an effective content of a biocide and surfactant (100 to 400 ppm each), and when the grout is to be used where root inhibition is desirable, an effective content of 2,6-dichlorobenzonitrile (e.g. 50% on an inert carrier) with a surfactant to disperse it (100 to 400 ppm of each). The preferred composition of aqueous component B is a solution of 1 to 10 weight % of ammonium persulfate (AP) in water. It may also contain dispersed therein part of the biocide and surfactant used in component A. In certain applications, an optional content of diatomaceous earth and dispersing agent as mentioned above may be present in both components. As stated, these A and B compositions are given for the normal situation in which these compositions are fed to the packer unit in approximately equal volume amounts.

The MgA, NaA, MBA grout of the present invention used at about 12 to 16%, preferably about 15%, monomer concentration, has an unusual combination of properties. It does not exhibit synersis (liberation of excess water) on initial gel formation. It expands up to about 10% by volume (but not excessively—20% or more) when the gel polymer is immersed in water. It maintains its volume in an environment of 100% relative humidity. The swelling and expansion (in contrast to the shrinkage normally expected of alkaline earth diacrylates used above) is attributed to the content of NaA in the grout of the present invention.

This grout produces a polymer gel which adapts it well to application within sewer lines or conduits by the use of conventional mixing packer equipment. It produces in a short time of 10 to 30 seconds or so, a gel of medium strength and having low enough adhesion to the inside of the sewer line and to the members of the packer to allow movement of the packer unit to the next grouting position after each grouting operation and such movement also breaks up or macerates the polymer gel inside the conduit at the grouted joint without pulling out an appreciable portion thereof from within the crack or fissure that is sealed thereby.

The grouting components A and B have low viscosity on the order of about 10 centipoises which allows practical pumping and pressures to force them through conventional sewer grouting equipment. They are adapted to be passed through the leaky joints or cracks of a sewer line to be grouted and to the soil around the line, using the conventional mixing-packer equipment.

The grout of the present invention contains no free acrylamide which is a neurotoxic chemical. The grout of the present invention (MgA, NaA, MBA) is of low toxicity and is considered to have one one-hundreth the toxic exposure of AM-9 as follows:

---

1/17 amount of toxic monomer in grout of the invention,

½ monomer toxicity (MBA has an $LD_{50}$ of 390 mg/kg; acrylamide shows an $LD_{50}$ of 200 mg/kg (albino rats), ½ MBA is not neurotoxic... "did not display neurotoxicity at dose schedules and conditions employed." (MRI Project No. 4308-N for OTS study dated May, 1979, page 287), ½ grout of the invention is a liquid; and any dust toxicity is eliminated.

---

The A and B component mixture of the present invention has a pH in the range of about 6 to 8 and gelation occurs controllably and rapidly (in about 10 to 40 seconds) after mixing. Since the two components are aqueous solutions or dispersions that can be supplied in that form to the grouting workers in the field, toxicity and fire hazards resulting from handling dusts and flammable or explosive organic solvents are virtually nonexistent in field operations for applying the grout of the present invention.

In the following illustrative examples, the parts and percentages are by weight and the temperatures are in degrees Centigrade unless otherwise indicated.

EXAMPLE 1

A monomer solution in water is prepared having the following composition:

| Monomer | Percent |
|---|---|
| Magnesium diacrylate (MgA) | 23.08 |
| Sodium acrylate (NaA) | 5.77 |
| N,N'-methylene-bisacrylamide (MBA) | 1.15 |
| Water, to make 100% | |

This may be considered a stock solution that is used to make up Component A for use in grouting a sewer line using existing packer equipment. This stock solution is identified as a. Other monomer stock solutions in water are given hereinbelow with identifications b, c, d, and e. Their compositions are:

| Monomer | Percent | | | |
|---|---|---|---|---|
| | b | c | d | e |
| MgA | 26.0 | 20.2 | 17.3 | 14.4 |
| NaA | 3.0 | 8.7 | 11.5 | 14.4 |
| MBA | 1.1 | 1.5 | 1.5 | 1.3 |

To 50 parts of each of the stock solutions a, b, c, d, and e, there is added 1.0 part of TEA (95% in water) and to another 50 parts of each of the stock solutions, there is added 2.0 parts of TEA (95% in water). The resulting ten solutions containing TEA, the latter five having twice as much TEA as the first five, are examples of component A that can be mixed with an approximately equal volume of initiator component B which in its simplest make-up consists of a solution in water of ammonium persulfate (AP).

The component B that is used with each of the first five of the TEA/monomer component A solutions is a solution of 2% AP in water, approximately 50 parts of the 2% AP solution being mixed, as at the discharge header of a packer, with 50 parts of the respective component A solution. These first five A and B mixtures when used in the field at about 20° (68° F.) have gel times of about 30 seconds. The component B made up for use with the last group of five TEA/monomer components A is a solution of 4% AP in water. When the latter AP solution is forced at approximately a rate of 50 parts for each 50 parts of a respective one of the last five TEA/monomer component A solutions through separate feed lines to the packer at field temperatures of about 10° (50° F.), the grout mixtures A and B give approximately 30-second gel times.

The application of the ten grouts described in the preceding two paragraphs by conventional packer grouting equipment commonly used in the grouting of sewer lines produces a polymer gel rapidly that is not so strongly adhered to the inside wall of the conduit and to the surfaces of the packer structure as to prevent movement of the deflated packer to the next leak (joint or crack) within seconds or a minute after air-testing of the seal and deflation of the packer bladders. The gel formed is also of moderate tear strength so that movement of the packer is capable of breaking up and macerating the gel inside the line without pulling the gel polymer out of the cracks, joints or fissures which extend through the wall of the sewer conduit. This enables the rapid, efficient movement of the packer from one end of the sewer line to the other with interruptions at each joint or crack to be grouted.

EXAMPLE 2

To each of the ten TEA/monomer solutions prepared in Example 1 above, there is added about 0.03 part of bis (tri-n-butyltin) oxide and about 0.005 part of a nonionic surfactant, such as t-nonylphenoxypoly(10)ethoxyethanol, to disperse the water-insoluble oxide. The resulting component A dispersions are applied with the appropriate AP-containing component B solutions in the manner described in Example 1 to reduce susceptibility to attack by fungi and bacteria of the resulting TEA/monomer solutions as well as that of the polymer gels produced in grouting the sewer conduits.

EXAMPLE 3

To each of the ten TEA/monomer solutions prepared in Example 1 above, there is added 0.1 part of a solution in mineral spirits containing 5% by weight of bis(tributyltin) oxide and 12.5% by weight of cetyldimethyl benzyl ammonium chloride, the latter compound serving to emulsify the oranotin oxide and also to supplement the biocidal action thereof. The resulting component A dispersions are applied with the appropriate AP-containing component B solutions in the manner described in Example 1. The resulting TEA/monomer dispersions are less susceptible to fungal and bacterial attack before application for grouting and the polymer gels produced in grouting sewer conduits are more resistant to such attack.

EXAMPLE 4

The procedure of Example 2 is repeated except that the biocide therein used is replaced with one part of a zinc salt of ethylbisdithiocarbamate.

EXAMPLE 5

The procedure of Example 2 is repeated except that the biocide therein used is replaced with one part of a manganese salt of ethylbisdithiocarbamate.

EXAMPLE 6

Example 2 is repeated except that 0.01 part of dichlorobenzonitrile is also added to each of the ten TEA/monomer/biocide compositions. The resulting compositions inhibit the growth of roots into the grouted sewer lines.

EXAMPLE 7

The procedure of Example 2 is repeated except that there is added to each of the TEA/monomer solutions or the AP solutions used about 4 parts of an unfired natural diatomaceous earth, of which 80% of the particles have sizes between 2 and 10 microns.

While the description hereinabove emphasizes adaptability of the grout components A and B of the present invention to application by the existing packer type of equipment which is moved within the sewer line after each grouting action to the next point in the line needing grouting, it is to be understood that the polymerizable mixture of monomers defined in accordance with the present invention may be applied by other procedures not limited to those involving equipment of the packer type. Thus for general grouting or sealing purposes, the appropriate amount of AP may simply be added with suitable dilution to any one of the ten TEA/monomer solutions produced in Example 1. The addition of the AP is withheld until just before application of the resulting mixture for sealing purposes.

As pointed out hereinabove the content of alkali metal acrylate is important in that it assures (1) a swelling or volume expansion of the polymer gel up to about 10% but not an excessive volume expansion of about 20% or more when the gel is submerged in water and (2) maintenance of its volume without shrinkage or appreciable expansion when stored in an atmosphere of 100% R.H. While the alkali metal acrylate specifically used in Example 1 through 7 is NaA, others, such as potassium acrylate (KA) are essentially equivalent in this respect. However, the use of calcium acrylate (CaA) instead of MgA in the monomer composition provides a grout having a long gel time making it impractical for use in sewer joint grouting by means of mixing packer equipment. The same is true of grouts in which the MgA is replaced with either magnesium methacrylate or calcium methacrylate.

I claim:

1. In a method of grouting joints or cracks of sewer conduits with the type of conventional equipment having a mixing packer unit movable within the conduit in succession from one point or zone of grouting to one or more others spaced along the conduit wherein the two components A and B of a two-part grouting composition are separately and simultaneously fed to the packer unit and rapidly form a grouting gel polymer upon mixing at the grouting zone and shorty after the grouting of one zone, the packer is moved to the next point needing grouting, and the moving and grouting is repeated to grout the leaky points therein, the improvement wherein the components A and B of the two part grouting composition that are fed separately and simultaneously to the packer unit at each grouting zone are the following: one part A being an aqueous 20 to 40 weight % monomer solution in which the monomers therein consist essentially of magnesium diacrylate, alkali metal acrylate, and covalent polyethylenically unsaturated monomer, the latter monomer being from 3 to 5% by weight of the sum of the diacrylate and acrylate monomer, part A also containing about 1 to 15% by weight of triethanolamine, the other part B being an aqueous solution of 1 to 20% by weight of ammonium persulfate; the proportion of ammonium persulfate in part B, the proportion of triethanolamine in part A, and the relative porportions of parts A and B that are fed to the packer and mixed on simultaneous discharge therefrom to the leaky joint or crack in the surrounding wall of the conduit being preselected in correlation to the temperature at the grouting zone to result in the formation of a polymer gel within a gel time of about 10 to about 40 seconds.

2. A method containing to claim 1 wherein the acrylate is sodium acrylate and the covalent comonomer is N,N'-methylene-bis-acrylamide and at least one of the two parts A and B contains a small but effective amount of an essentially water-insoluble biocide having slight water-solubility dispersed or emulsified therein by a surfactant, whereby the polymer gel formed on mixing A and B contains the biocide distributed throughout the gel mass where it is available for slow release.

3. A method according to claim 1 or claim 2 wherein the total monomer concentration in part A is between about 28 and 32% by weight and consists essentially of magnesium diacrylate, sodium acrylate, and N,N'-methylenebisacrylamide, the last monomer being present in an amount of about 4% by weight, based on the total weight of the metal acrylate monomers.

4. A method according to claim 3 wherein at least one of the two parts A and B contains a small but effective amount of 2,6-dichlorobenzonitrile to inhibit entry and growth of roots in, on, or around the polymer gel produced.

* * * * *